United States Patent Office 3,823,007
Patented July 9, 1974

---

3,823,007
HERBICIDAL METHOD USING SALTS OF BENZENESULFONYL UREAS
John A. Stephens, St. Louis, Mo., assignor to Monsanto Company, St. Louis, Mo.
No Drawing. Continuation-in-part of abandoned application Ser. No. 210,220, July 16, 1962. This application Jan. 14, 1969, Ser. No. 791,183
Int. Cl. A01n 9/14
U.S. Cl. 71—103                       1 Claim

ABSTRACT OF THE DISCLOSURE

The use of salts of substituted benzenesulfonyl ureas as herbicides.

---

This application is a continuation-in-part of Ser. No. 210,220, filed July 16, 1962, now abandoned.

This invention relates to the control of plant growth by the application of a herbicidal effective amount of a salt of substituted benzenesulfonyl urea.

The anionic portion of the salts of substituted benzenesulfonyl ureas is a resonance hybrid

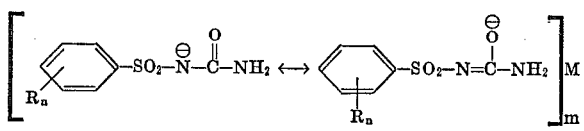

which has the terminology of "isourea" or "urea" depending upon the charge location. For convenience the terminology "isourea" and the hybrid formula

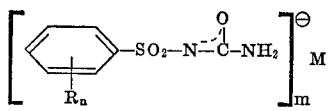

will be used in the specification and the appended claim when referring to specific compounds of the formulae.

The effective compounds of this invention are the formula

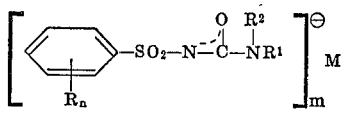

wherein R is selected from the group consisting of chloro, bromo, iodo, cyano, alkyl having a maximum of four carbon atoms, alkoxy having a maximum of four carbon atoms, nitro, amino and the group

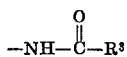

wherein $R^3$ is hydrogen or alkyl having a maximum of four carbon atoms; $n$ is the integer one to three, provided that when $n$ is one R is substituted in the 4'-position of the phenyl ring; $m$ is the integer one or two and is dependent upon the valence of M; M is selected from the group consisting of alkali metals, alkaline earth metals and ammonium; and $R^1$ and $R^2$ are each independently selected from the group consisting of hydrogen, alkyl having a maximum of twelve carbon atoms, alkoxy having a maximum of five carbon atoms, alkynyl having at least three and a maximum of five carbon atoms, phenyl, substituted phenyl having a maximum of three substituents said substituents being selected from the group consisting of alkyl having a maximum of four carbon atoms, bromine, chlorine, alkoxy having a maximum of four carbon atoms, phenoxy, mono and dihalogenated phenoxy said halogen being chlorine or bromine and the group

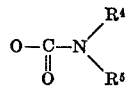

said group being in the 3-position wherein $R^4$ and $R^5$ are each independently selected from the group consisting of hydrogen and alkyl having a maximum of four carbon atoms.

A preferred embodiment of this invention is when the compounds are of the formula

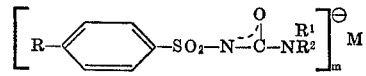

wherein R is selected from the group consisting of chloro, bromo, iodo, nitro, amino and the group

wherein $R^3$ is hydrogen or alkyl having a maximum of four carbon atoms, $R^1$ and $R^2$ are each independently selected from the group consisting of hydrogen, alkyl having at least seven and a maximum of twelve carbon atoms, alkoxy having a maximum of four carbon atoms, alkynyl having at least three and a maximum of five carbon atoms, mono substituted phenyl, said substituent being selected from the group consisting of alkoxy having a maximum of four carbon atoms, phenoxy, mono and dihalogenated phenoxy, said halogen being chlorine or bromine, and the group

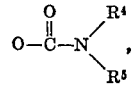

said group being in the 3-position, wherein $R^4$ and $R^5$ are each independently selected from the group consisting of hydrogen and alkyl having a maximum of four carbon atoms, provided that both $R^1$ and $R^2$ are not hydrogen; M and $m$ are as previously defined.

The salts useful in the methods of this invention and processes for making them are well known in the art. They can be prepared by reacting the properly substituted arylsulfonamide with a suitable cyanate. For example, potassium 1-(p-nitrobenzenesulfonyl) isourea can be prepared by heating substantially equimolar amounts of p-nitrobenzenesulfamide and potassium cyanate in the presence of an aqueous medium under reflux for about 8 hours, cooling the reaction mixture and recovering the product by filtration. More detailed procedures for the preparation of various substituted benzenesulfonyl-isourea salts are set forth in Martin et al., U.S. Pat. No. 2,411,661 (Nov. 26, 1946) and Haack, U.S. Pat. 2,385,571 (Sept. 25, 1945), and the disclosures thereof are incorporated herein by reference.

Preparation of compounds in which either $R^1$ or $R^2$ or both $R^1$ and $R^2$ are other than hydrogen is by the following reaction:

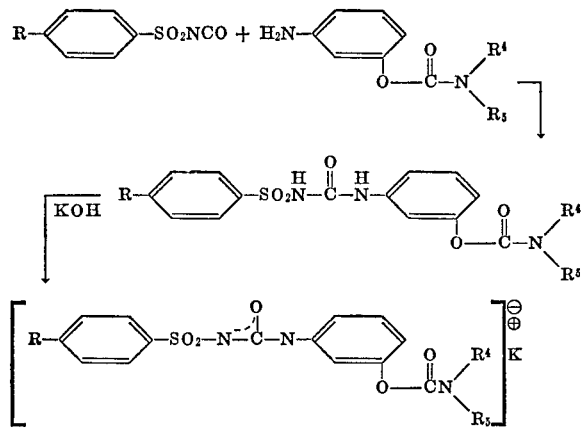

wherein R, $R^4$ and $R^5$ are as previously defined.

Other examples of compounds prepared are:

potassium 1-(p-chlorobenzenesulfonyl) isourea
potassium 1-(p-bromobenzenesulfonyl) isourea
potassium 1-(p-nitrobenzenesulfonyl) isourea
calcium 1-(p-nitrobenzenesulfonyl) isourea
magnesium 1-(p-nitrobenzenesulfonyl) isourea
sodium 1-(p-nitrobenzenesulfonyl) isourea
barium 1-(p-nitrobenzenesulfonyl) isourea
ammonium 1-(p-nitrobenzenesulfonyl) isourea
potassium 1-(p-methoxybenzenesulfonyl) isourea
calcium 1-(p-methoxybenzenesulfonyl) isourea
barium 1-(p-aminobenzenesulfonyl) isourea
calcium 1-(p-aminobenzenesulfonyl) isourea
magnesium 1-(p-aminobenzenesulfonyl) isourea
sodium 1-(p-aminobenzenesulfonyl) isourea
potassium 1-(p-aminobenzenesulfonyl) isourea
ammonium 1-(p-aminobenzenesulfonyl) isourea
potassium 1-(p-cyanobenzenesulfonyl) isourea
calcium 1-(p-cyanobenzenesulfonyl) isourea
calcium 1-(p-formylaminobenzenesulfonyl) isourea
potassium 1-(p-acetylaminobenzenesulfonyl) isourea
calcium 1-(p-acetylaminobenzenesulfonyl) isourea
potassium 1-(p-methylbenzenesulfonyl) isourea
calcium 1-(p-methylbenzenesulfonyl) isourea
potassium 1-(3,4-dichlorobenzenesulfonyl) isourea
calcium 1-(3,4-dichlorobenzenesulfonyl) isourea
potassium 1-(2-chloro-5-nitrobenzenesulfonyl) isourea
calcium 1-(2-chloro-5-nitrobenzenesulfonyl) isourea
potassium 1-(3,5-dichloro-4-aminobenzenesulfonyl) isourea
calcium 1-(3,5-dichloro-4-aminobenzenesulfonyl) isourea
sodium 1-(p-chlorobenzenesulfonyl)-3-methylisourea
sodium 1-(p-chlorobenzenesulfonyl)-3-ethylisourea
sodium 1-(p-nitrobenzenesulfonyl)-3-methylisourea
calcium 1-(p-nitrobenzenesulfonyl)-3-dodecylisourea
sodium 1-(p-nitrobenzenesulfonyl)-3,3-dimethylisourea
potassium 1-(p-nitrobenzenesulfonyl)-3-methyl-3-n-butylisourea
magnesium 1-(p-aminobenzenesulfonyl)-3-n-octylisourea
calcium 1-(p-aminobenzenesulfonyl)-3-isopropyl-3-proparglyisourea
calcium 1-(p-nitrobenzenesulfonyl)-3-(3'-tertiarybutyl-carbamoyloxyphenyl) isourea
potassium 1-(p-aminobenzenesulfonyl)-3-(2',4'-dimethylphenyl) isourea
sodium 1-(p-nitrobenzenesulfonyl)-3-[4'-(4"-chlorophenoxy)-phenyl] isourea
calcium 1-(p-aminobenzenesulfonyl)-3-methoxyisourea
barium 1-(p-chlorobenzenesulfonyl)-3-(3'-bromo-4'-chlorophenyl) isourea.

The following examples illustrate the invention. Parts and percent are by weight unless otherwise indicated.

The term "plant system" as used herein and in the appended claim means germinant seeds, emerging seedlings and established vegetation including the roots and above-ground portions.

EXAMPLE 1

The pre-emergent herbicidal activity of representative salts of substituted benzenesulfonylureas of this invention is demonstrated as follows:

A good grade of top soil is placed in aluminum pans and compacted to a depth ⅜" to ½" from the top of each pan. A predetermined number of seeds of each of several plant species are placed on top of the soil in the pans. The herbicidal compositions are applied to the soil by two methods:

(1) application to the surface of the top soil layer, and
(2) admixture with or incorporation in the top soil layer.

In the surface application method, the seeds are covered with a ⅜" layer of prepared soil and the pans leveled. The herbicidal composition is applied by spraying the surface of the top layer of soil, prior to watering the seeds, with a solution containing a sufficient amount of active ingredient to obtain the desired rate per acre on the soil surface. In the soil incorporation method, the soil required to fill the pans is weighed and admixed with a herbicidal composition containing a known amount of active ingredient. The seeds are then covered with the admixture and leveled. Initial watering is carried out by permitting the soil to absorb moisture through the apertured bottom of the pans.

The seed containing pans are placed on a wet sand bench and maintained for approximately 14 days under ordinary conditions of sunlight and watering. The plants are observed at the end of approximately 14 days and the results recorded. The herbicidal activity index is based on the average percent germination of each seed lot. The activity index is converted to a relative numerical scale for the sake of brevity and simplicity in the examples.

The pre-emergent herbicidal activity index used in the following example is defined as follows:

| Numerical scale: | Herbicidal activity |
|---|---|
| 0 | None. |
| 1 | Slight. |
| 2 | Moderate. |
| 3 | Severe. |

The pre-emergent herbicidal activity of some of the salts of substituted benzenesulfonylurea of this invention is recorded in Table I for a rate of five pounds per acre of the active ingredients in both surface and soil-incorporation applications. Compound (c) is by surface application, the remaining compounds are by soil incorporation.

TABLE I.—PRE-EMERGENT HERBICIDAL ACTIVITY

| Plant species | Compound | | | | | |
|---|---|---|---|---|---|---|
| | (a) | (b) | (c) | (d) | (e) | (f) |
| Morning glory | 3 | 0 | 0 | 0 | 2 | 1 |
| Wild oat | 0 | 2 | 3 | 2 | 3 | 2 |
| Brome grass | 0 | 3 | 3 | 2 | 3 | 3 |
| Rye grass | 1 | 2 | 2 | 2 | 3 | 3 |
| Radish | 3 | 3 | 3 | 3 | 3 | 1 |
| Sugar beet | 3 | 1 | 3 | 1 | 3 | 1 |
| Cotton | | 2 | | 2 | 1 | 0 |
| Corn | | 3 | | 1 | 1 | 0 |
| Foxtail | 0 | 3 | 3 | 3 | 3 | 3 |
| Barnyard grass | | 1 | | 1 | 2 | 1 |
| Crabgrass | 3 | 3 | 3 | 3 | 3 | 3 |
| Pigweed | 3 | 1 | 3 | 1 | 2 | 1 |
| Soybean | 2 | 0 | 0 | 1 | 1 | 1 |
| Wild buckwheat | 2 | 0 | 1 | 3 | 3 | 1 |
| Tomato | 1 | 0 | 0 | 0 | 2 | 0 |
| Sorghum | 0 | 0 | 3 | 2 | 2 | 2 |
| Rice | | 2 | | 3 | 3 | 2 |

[1] Results of Compound (f) were read after 3 weeks.

NOTE.—
Compound (a): potassium 1-(p-chlorobenzenesulfonyl) isourea.
Compound (b): calcium 1-(p-nitrobenzenesulfonyl) isourea.
Compound (c): ammonium 1-(p-nitrobenzenesulfonyl) isourea.
Compound (d): magnesium 1-(p-aminobenzenesulfonyl) isourea.
Compound (e): sodium 1-(p-aminobenzenesulfonyl) isourea.
Compound (f): calcium 1-(p-formylaminobenzenesulfonyl) isourea.

EXAMPLE 2

This example demonstrates the post-emergent herbicidal activity of representative salts of substituted benzene-sulfonyl ureas of this invention. The active ingredients are applied in spray form to 14 or 21 day old specimens of the same plant species used in the pre-emergent test above. The herbicidal sprays are acetone-water solutions containing 0.5% active ingredient. The treated plants are placed in a greenhouse and the effects are observed and recorded after approximately 14 days.

The post-emergent herbicidal activity index used in this example is based on the average percent injury of each plant species and is defined as follows:

| Numerical scale: | Herbicidal activity |
| --- | --- |
| 0 | None. |
| 1 | Slight. |
| 2 | Moderate. |
| 3 | Severe. |
| 4 | Plants dead. |

TABLE II.—POST-EMERGENT HERBICIDAL ACTIVITY

| Plant species | Compound | | | |
| --- | --- | --- | --- | --- |
| | (a) | (b)[1] | (c) | (d)[2] |
| Morning glory | 0 | 0 | 3 | 0 |
| Wild oat | 0 | 2 | 3 | 3 |
| Brome | 0 | 2 | 3 | 3 |
| Rye grass | 1 | 1 | 3 | 1 |
| Radish | 4 | 0 | 3 | 2 |
| Sugar beet | 4 | 0 | 2 | 2 |
| Cotton | 2 | | 3 | |
| Corn | 1 | | 3 | |
| Foxtail | 2 | 3 | 3 | 2 |
| Barnyard grass | 1 | | 3 | 3 |
| Crabgrass | 2 | 1 | 3 | 3 |
| Pigweed | 4 | 0 | 3 | 1 |
| Soybean | 2 | 2 | 3 | 2 |
| Wild buckwheat | 3 | 0 | 2 | |
| Tomato | 4 | 0 | 2 | |
| Sorghum | 2 | 2 | 3 | |

[1] Compound (b) was tested on three week old plants.
[2] Compound (d) was observed four weeks after application.
NOTE.—
Compound (a): calcium 1-(3,4-dichlorobenzenesulfonyl) isourea.
Compound (b): ammonium 1-(p-aminobenzenesulfonyl) isourea.
Compound (c): sodium 1-(p-nitrobenzenesulfonyl) isourea.
Compound (d): sodium 1-(p-nitrobenzenesulfonyl)-3-methylisourea.

The herbicidal compositions of this invention comprise an active ingredient and one or more herbicidal adjuvants which can be solid or liquid extenders, carriers, diluents, conditioning agents and the like. Preferred herbicidal compositions containing the active ingredients of this invention have been developed so that the active ingredients can be used to the greatest advantage to modify the growth of plant systems in soil. The preferred compositions comprise certain wettable powders, aqueous suspensions, dust formulations, granules emulsifiable oils and solutions in solvents. In general those preferred compositions can all contain one or more surface-active agents.

Surface-active agents which can be used in the herbicidal compositions of this invention are set out, for example in Searle U.S. Pat. 2,426,417, Todd U.S. Pat. 2,655,447, Jones U.S. Pat. 2,412,510 and Lenher U.S. Pat. 2,139,276. A detailed list of such agents is also set forth by J. W. McCutcheon in "Soap and Chemical Specialties," Novmber 1947, page 8011 et seq., entitled "Synthetic Detergents;" "Detergents and Emulsifiers—Up to Date" (1960), by J. W. McCutcheon, Inc., and Bulletin E-607 of the Bureau of Entomology and Plant Quarantine of the U.S.D.A. In general less than 15 parts by weight of the herbicidal composition.

Wettable powders are water-dispersible compositions containing one or more active ingredients, an inert solid extender and one or more wetting and dispersing agents. The inert solid extenders are usually of mineral origin such as the natural clays, diatomaceous earth and synthetic minerals derived from silica and silicate. Examples of such extenders include kaolinites, attapulgite clay and synthetic magnesium silicate.

Preferred wetting agents are alkyl benzene and alkyl naphthalene sulfonates, sulfated fatty alcohols, amines or acid amides, long chain acid esters of sodium isothionate, esters of sodium sulfosuccinate, sulfated or sulfonated fatty acid esters, petroleum sulfonates, sulfonated vegetable oils and ditertiary acetylinic glycols. Preferred dispersants are methyl cellulose, polyvinyl alcohol, sodium lignin sulfonates, polymeric alkyl naphthalene sulfonates, sodium naphthalene sulfonate, polymethylene bisnaphthalenesulfonate and sodium N-methyl-N-(long chain acid) taurates.

The wettable powders compositions of this invention usually contain from about 5 to about 95 parts of active ingredient, from about 0.25 to about 3.0 parts of wetting agent, from about 0.25 to about 7 parts of dispersant and from about 4.5 to about 94.5 parts of inert solid extender, all parts being by weight of the total composition. Where required from about 0.1 to 2.0 parts by weight of the solid inert extender can be replaced by a corrosion inhibitor or anti-foaming agent or both.

Aqueous suspensions are usually prepared by mixing together an aqueous slurry of water-insoluble active ingredient in the presence of dispersing agents to obtain a concentrated slurry of very finely-divided particles. The resulting concentrated aqueous suspension is characterized by its extremely small particle size, so that when diluted and sprayed coverage is very uniform.

Dusts are dense finely-divided particulate compositions which are intended for application to the soil in dry form. Dusts are characterized by their free-flowing and rapid settling properties so that they are not readily wind-borne to areas where they are of no value. Dusts contain primarily an active ingredient and a dense, free-flowing, finely-divided particulate extender. However, their performance is sometimes aided by the inclusion of a wetting agent such as those listed hereinbefore under wettable powder compositions and convenience in manufacture frequently demands the inclusion of an inert, absorptive grinding aid. Suitable classes of grinding aids are natural clays, diatomaceous earth and synthetic minerals derived from silica or silicate. Preferred grinding aids include attapulgite clay, diatomaceous silica, synthetic fine silica and synthetic calcium and magnesium silicates.

The inert finely-divided solid extender for the dusts can be of vegetable or mineral origin. The solid extenders are characterized by possessing relatively low surface areas and are poor in liquid absorption. Suitable inert solid extenders for herbicidal dusts include micaceous talcs, pyrophyllite, dense kaoline clays, ground calcium phosphate rock and tobacco dust. The dusts usually contain from about 0.5 to 99 parts active ingredient, 0 to 50 parts grinding aid, 0 to 3 parts wetting agent and 1 to 99.5 parts dense solid extender, all parts being by weight based on the total weight of the dust.

The wettable powders described above may also be used in the preparation of dusts. While such wettable powders could be used directly in dust form, it is more advantageous to dilute them by blending with the dense dust diluent. In this manner, dispersing agents, corrosion inhibitors, and antifoam agents may also be found as components of a dust.

Emulsifiable oils are usually solutions of active ingredient in water-immiscible solvents together with a surfactant. Suitable solvents for the active ingredient of this invention include hydrocarbons and water-immiscible ethers, esters or ketones. Suitable surfactants are anionic, cationic and non-ionic such as alkyl aryl polyethoxy alcohols, alkyl and alkyl aryl polyether alcohols, polyethylene sorbitol or sorbitan fatty acid esters, polyethylene glycol fatty esters, fatty alkyllol amide condensates, amine salts of fatty alcohol sulfates together with long chain alcohols and oil soluble petroleum sulfonates or mixtures thereof. The emulsifiable oil compositions generally contain from about 5 to 95 parts active ingredient, about 1 to 10 parts surfactant and about 4 to 94 parts solvent, all parts being by weight based on the total weight of emulsifiable oil.

Granules are physically stable particulate compositions comprising active ingredient adhering to or distributed through a basic matrix of an inert, finely-divided particulate extender. In order to aid leaching of the active ingredient from the particulate, a surfactant such as those listed herein-before under wettable powders can be present in the composition. Natural clays, pyrophyllites and vermiculite are examples of operable classes of particulate mineral extenders. The preferred extenders are the porous, absorptive, preformed particles such as preformed and screened particulate attapulgite or heat expended, particulate vermiculite, and the finely-divided clays such as kaolin clays, hydrated attapulgite or bentonitic clays. These extenders are sprayed or blended with the active ingredient to form the herbicidal granules.

The mineral particles which are used in the granular herbicidal compositions of this invention usually have a size range of 10 to 100 mesh, but preferably such that a large majority of the particles have from 14 to 60 mesh with the optimum size being from 20 to 40 mesh. Clay having substantially all particles between 14 and 80 mesh and at least about 80 percent betwen 20 and 40 mesh is particularly preferred for use in the present granular compositions. The term "mesh" as used herein means U.S. Sieve Series.

The granular herbicidal compositions of this invention generally contain from about 1 part to about 30 parts by weight of a salt of a substituted benzenesulfonyl urea per 100 parts by weight of clay and 0 to about 5 parts by weight of wetting agent per 100 parts by weight of clay. The preferred herbicidal granular compositions contain from about 5 parts to about 25 parts by weight of active ingredient per 100 parts by weight of clay.

The herbicidal compositions of this invention can also contain other additaments, for example, fertilizers, other herbicides, pesticides and the like, used as adjuvant or in combination with any of the above-described adjuvants.

The compounds of this invention may be used in combination with known herbicides in order to provide enhanced biological effectiveness. The use of various herbicides in combination at the time of a single application or sequentially is common in practice. Herbicides which may be used in combination with the compounds of this invention include but are not limited to: substituted phenoxyaliphatic acids such as 2,4-dichlorophenoxyacetic acid; 2,4,5-trichlorophenoxyacetic acid, 2-methyl-4-chlorophenoxyacetic acid and the salts, esters and amides thereof; triazine derivatives, such as 2-chloro-4-ethylamino-6-isopropylamino-s-triazine; 2,4-bis(isopropylamino) - 6 - methoxy-s-triazine and 2-methylmercapto-4,6-bis(isopropylamino) - s - triazine; urea derivatives such as 3-(3,4-dichlorophenyl)-1,1-dimethylurea and 3-(m-trifluoromethylphenyl)-1,1-dimethylurea and 3-(3,4-dichlorophenyl)-1-methoxy-1-methylurea; pyridylium derivatives such as 1:1'-ethylene-2,2-dipyridylium dihalide; acetanilides such as N-isopropyl-alpha-chloroacetanilide, and 2-chloro-2', 6'-diethyl-N-methoxymethyl acetanilide; acetamides such as N,N-diallyl-alphachloroacetamide, carbamates such as ethyl-N,N-di-n - propylthiolcarbamate, and 2,3 - dichloroallyl diisopropylthiolcarbamate; substituted uracils such as 5-bromo-3-sec-butyl-6-methyluracil, substituted anilines such as N,N-dipropyl-alpha,alpha,alpha - trifluoro - 2,6-dinitro-p-toluidine; pyridazole derivatives such as 5-amino-4-chloro-2-phenyl-3-(2H)-pyridazinone, and the like.

Fertilizers useful in combination with the active ingredients include, for example ammonium nitrate, urea and superphosphate. Other useful additaments include materials in which plant organisms take root and grow such as compost, manure, humus, sand and the like.

When operating in accordance with the present invention, effective amounts of the salts of substituted benzenesulfonyl ureas are dispersed on or in the soil or plant growth media and applied to plant systems in any convenient fashion. Application to the soil or growth media can be carried out by simply mixing with the media, by applying to the surface of the soil and thereafter dragging or discing into the soil to the desired depth, or by employing a liquid carrier to accomplish the penetration and impregnation. The application of liquid and particulate solid herbicidal compositions to the surface of soil or to plant systems can be carried out by conventional methods, e.g., power dusters, boom and hand sprayers and spray dusters. The compositions can also be applied from airplanes as a dust or a spray because of their effectiveness at low dosages. In a further method, the distribution of the active ingredients in soil can be carried out by admixture with the water employed to irrigate the soil. In such procedures, the amount of water can be varied with the porosity and water holding capacity of the soil to obtain the desired depth of distribution of the herbicide.

The application of an effective or herbicidal amount of the salts of substituted benzenesulfonyl ureas to the soil or growth media or plant systems is essential and critical for the practice of one embodiment of the present invention. The exact amount of active ingredient to be employed is dependent upon the response desired in the plant as well as such other factors as the plant species and stage of development thereof, the specific soil and depth at which the active ingredients are distributed in the soil and the amount of rainfall as well as the specific salt of the substituted benzenesulfonyl urea employed. In foliar treatment for the control or modification of vegetative growth, the active ingredients are applied in amounts from about 1 to about 50 or more pounds per acre. In applications to soil for the control or modification of the growth of germinant seeds, emerging seedlings and established vegetation, the active ingredients are applied in amounts from about 1 to about 50 or more pounds per acre. It is believed that one skilled in the art can readily determine from this specification, including examples, the application rate for any specific situation.

The terms "soil" and "growth media" are employed in the present specification and claims in their broadest sense to be inclusive of all conventional "soils" as defined in Webster's New International Dictionary, Second Edition, Unabridged (1961). Thus, the terms refer to any substance or media in which vegetation may take root and grow, and are intended to include not only earth but compost, manure, muck, humus, sand and the like, adapted to support plant growth.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claim appended hereto be limited to the examples and description set forth herein but rather the claim be construed as encompassing all the features of patentable novelty which reside in the present invention including all features which would be treated as equivalents thereof by those skilled in the art to which the invention pertains.

What is claimed is:
1. A method of preventing the growth of undesirable plants which comprises applying to the plant system a herbicidially effective amount of calcium 1-(3,4-dichlorobenzenesulfonyl) isourea.

References Cited
UNITED STATES PATENTS

| | | | |
|---|---|---|---|
| 2,385,571 | 9/1945 | Haack | 260—397.7 |
| 2,411,661 | 11/1946 | Martin et al. | 260—397.7 |

JAMES O. THOMAS, Jr., Primary Examiner

U.S. Cl. X.R.

71—92, 93, 94